US010104310B1

(12) United States Patent
Roberts

(10) Patent No.: US 10,104,310 B1
(45) Date of Patent: Oct. 16, 2018

(54) GEOSPATIAL SECURITY MONITORING ASSET ASSOCIATION

(71) Applicant: SureView Systems, LLC, Tampa, FL (US)

(72) Inventor: Paul Roberts, St. Petersburg, FL (US)

(73) Assignee: Sureview Systems, LLC, Tampa, FL (US)

( * ) Notice: Subject to any disclaimer, the term of this patent is extended or adjusted under 35 U.S.C. 154(b) by 321 days.

(21) Appl. No.: 15/235,555

(22) Filed: Aug. 12, 2016

(51) Int. Cl.
*G08B 13/14* (2006.01)
*H04N 5/247* (2006.01)
*G08B 13/196* (2006.01)
*H04W 4/021* (2018.01)

(52) U.S. Cl.
CPC ....... *H04N 5/247* (2013.01); *G08B 13/19691* (2013.01); *G08B 13/19697* (2013.01); *H04W 4/021* (2013.01)

(58) Field of Classification Search
CPC ........ G08B 13/19645; G08B 13/19695; G08B 25/003; G08B 29/20; H04N 7/181; H04N 7/183; H04N 7/186
See application file for complete search history.

(56) References Cited

U.S. PATENT DOCUMENTS

| 6,253,064 | B1 * | 6/2001 | Monroe | G08G 5/0082 455/430 |
| 2009/0315699 | A1 * | 12/2009 | Satish | G08B 25/009 340/533 |

* cited by examiner

*Primary Examiner* — Omeed Alizada
(74) *Attorney, Agent, or Firm* — Nicholas Pfeifer; Smith & Hopen, P. A.

(57) ABSTRACT

A security-monitoring platform adapted to automatically create real-time associations between security monitoring assets (SMAs) and a security alert based on location specific information for both the SMAs and the source of the security alert. When an alert occur, the security-monitoring platform automatically retrieves location and/or movement information for the source of the security alert. The system then retrieves and analyzes location and/or movement information for a plurality of SMAs to determine whether any SMAs are within a set of location-based parameter limits. Those SMAs that fall within the limits are automatically associated with the security alert and provided to the operator of the security monitoring platform. The system is further adapted to continuously evaluate the location and movement of the SMAs and the active security alert to ensure that the associations are always up-to-date as the security alert is processed.

13 Claims, 5 Drawing Sheets

GEOSPATIAL SECURITY MONITORING ASSET ASSOCIATION

BACKGROUND OF THE INVENTION

1. Field of the Invention

This invention relates, generally, to a security-monitoring system. More specifically, it relates to a security-monitoring platform configured to automatically identify and analyze a security alert and then automatically associate one or more security monitoring assets with the security alert based on real-time location and movement information.

2. Brief Description of the Prior Art

Effectively securing an asset or facility typically requires numerous and various types of security systems. Ideally, all of the security systems protecting the object or facility are monitored and controlled by a single security-monitoring platform (SMP). An SMP is designed to integrate these disparate security systems by aggregating the system-specific information into a single interface. Effectively, the SMP provides operator(s) with an enhanced level of situational awareness when responding to security alerts.

Security systems include, but are not limited to, video systems, door access control systems to control who can access the location or areas within, intrusion detection systems to detect intruders (for example motion detection sensors or thermal detection sensors), audio systems to provide one-way or two-way audio communications, lone worker GPS-enabled devices with a panic button for guards, and situational awareness systems to provide information outside of traditional alarm sources, such as earthquake and weather warnings. Each security system usually contains several types of security monitoring assets. A security monitoring asset includes, but is not limited to, any alarm source, video source, output, security personnel, or audio source used to secure an object, facility, or person. Each security monitoring asset provides different operational capabilities, including but not limited to:

Security Alert Sources: when triggered raise an alert (such as a door or window being forced open or a motion sensor being triggered) to the SMP operator, which the operate must process. The security alerts can also include location information if the security alert source is moving, such as a vehicle moving outside of a geofence or a mobile guard who has raised an SOS alarm.

Cameras: allow the operator to view what is happening at a location.

Audio Inputs and Outputs: allow the operator to hear what is happening at the location and also transmit sound to the location, respectively (e.g. intercoms to verify someone's identity and then let them in, and public address systems to transmit a warning and scare off a potential intruder).

Outputs and Doors: allow the operator to control various systems (e.g. opening gates, turning on lights, granting access to doors).

Security Personnel: the operator can directly contact personnel via a communication systems integrated with the SMP to either warn them of the security event or have them participate in the processing of the event as a local resource.

Typically, the various security systems by themselves lack the necessary hardware and software to interact with other security systems. For that reason, SMPs are designed to integrate several security systems into a single, more easily managed platform. Each security system includes a system-specific application programming interface (API). The API for each security system is unique to that security system, but each API provides the necessary communicability to enable a user to control and utilize the security system. For example, an API can create (1) a connection to web services inside the security system allowing a user to execute commands to query and control the security system's security monitoring assets, (2) a connection to the data store of the security system, and/or (3) a proprietary connection through a software development kit (SDK) with functions allowing a user to query and control the security system's security monitoring assets.

Moreover, some APIs are configured to send regular "heartbeat" messages that inform the SMP if a particular security monitoring asset is no longer available/operating. Further, the APIs provide a means to seamlessly update the SMP's catalogue of a security system's security monitoring assets. When a security monitoring asset is removed or added to a security system, the security system's API communicates that update to the SMP. Because the security monitoring asset includes location-based technology, no additional information must be manually entered into the SMP and no association information must be catalogued prior to operation.

As shown in FIG. 1, security systems 102, and in turn their respective security monitoring assets 103-107, are in communication with a conventional SMP 101 using the security system's manufacturer's API. Once connected, SMP operator 108 is capable of interacting with a particular security monitoring asset 103-107 (e.g. receive alarms from the alarm devices 103, view live video from camera devices 104, transmit/receive audio from audio devices 105, control the outputs of output devices 106, and communicate with security personnel 107). FIG. 1 provides a simplified illustration of SMP 101 communicating with only a few security systems 102, however, SMPs are intended to operate with numerous security systems to provide a fully integrated platform.

The security monitoring assets are preferably strategically arranged with respect to one another to provide the SMP operator with optimal situational awareness. For example, FIG. 2 provides a simplified exemplary illustration of the arrangement of security monitoring assets around building 201 located within an area 202. Building 201 includes a window monitored by alarm 203, a door monitored by alarm 204, an intercom and control output 205 integrated with the door, camera 206, and guard 211. The exterior of building 201 is monitored by northwest camera 207, southwest camera 208, northeast camera 209, public address system 210, guard 211, and vehicle 213. The SMP operator must perform a number of manual actions when a security alert is triggered to work out where the alert originated and what security monitoring assets he/she can interact with to properly handle the alert. For example, the SMP operate must determine which cameras to view, whether audio interaction is required, whether any output control is required, which guards or staff with whom he/she should interact, and which other security alerts have been triggered nearby that may be part of the same event (e.g. an external window forced open and then a motion detection alert inside the building as the intruder moves around inside).

Most of the current SMP systems require an initial set-up phase, where an individual associates security monitoring assets with respect to each other and stores all of the associations between security monitoring assets in a database accessible by the SMP. When a security alert occurs after the SMP is operational, the SMP accesses the database to retrieve the information for the security monitoring assets that are associated with the particular security alert. For example, if the door alarm 204 in FIG. 2 is triggered, the SMP will retrieve the camera feeds for cameras 207 and 208 and also the controls for intercom and control output 205, assuming of course that for cameras 207 and 208 and control output 205 have been properly associated with door alarm 204. As an alternative to a system that rely on pre-operation associations, some smaller systems require the SMP operator to associate security monitoring assets with security alerts on the fly as the operator processes the security alert. Obviously, such a system is inherently flawed when dealing with hundreds or thousands of security monitoring assets.

FIG. 3 provides an exemplary illustration of how a current SMP processes a security alert. When a security alert is received 302, the system checks if the security alert source is non-static/moving 304. If the security alert source is indeed non-static/moving, then nothing more can be done because it is not physically possible to associate a security monitoring asset with something that is moving and the system, at most, provides the SMP operator with the option to manually interact with available security monitory assets 306. Thus, the operator must manually process the event ad-hoc by determining which assets, of potentially thousands, will aid the operator in accurately and efficiently processing the security alert.

Both of the above described systems suffer from two inherent flaws. One flaw is the inability of the systems to fluidly interact with non-static security assets, such as guards or vehicles (see issue number five below). The second flaw is the requirement of human interaction to associate security monitoring assets with security alerts. Both of these flaws are subject to human error and produce slower response times, which can have a significant negative impact in the security industry. The issues are further analyzed in the list below:

Processing the event "ad-hoc" without an association carries the critical risk of the operator selecting an incorrect asset and failing to properly process the event (e.g. missing an intruder by selecting the wrong camera, or leaving someone waiting at an intercom by failing to perform the correct audio action). This risk is exponentially greater when the system operator is responsible for hundreds or even thousands of security monitoring assets.

Creating associations between event sources and assets to cover all scenarios takes a vast amount of planning to ensure all scenarios are covered.

Any scenarios that are missed result in the operator having to process the event ad-hoc without any association information, which is extremely difficult when dealing with a substantial number of security monitoring assets.

Manually inputting associations requires a vast amount of data entry (as it may be millions of combinations of event sources and assets spread worldwide). Thus, the process is extremely time consuming and subject to human error. In addition, any updates to the electronic monitoring security devices in operation or inclusions of additional electronic monitoring security devices requires a manual association update, which may necessitate an operator to visit the site to determine the correct associations.

The associations do not account for moving security alerts or security monitoring assets. A traditional SMP cannot associate an event from a moving person or vehicle to static assets like cameras because the location of the moving asset is unknown when an alert is triggered.

If the security alert source is static/not moving, then the system determines whether the security alert source is associated with any security monitoring assets 308. If an association does not exist, then the system, at most, provides the SMP operator with the option to manually interact with available security monitory assets 306. If an association exists, the operator is presented with the security monitoring asset(s) 310.

Accordingly, what is needed is a system and method to automatically create and maintain real-time associations between security monitoring assets when a security alert is triggered. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a system and method to reduce the time and effort needed to create and maintain an accurate real-time association between an electronic monitoring security device and another electronic monitoring security and/or a security alert is now met by a new, useful, and nonobvious invention.

The novel invention includes a system and method for automatically creating and maintaining real-time associations between security monitoring assets (SMAs) and a security alert using location-based information. The novel method is typically triggered when a security alert is received by a security monitoring platform. Subsequently, the system identifies the source of the security alert and retrieves location-based information from the source. The location-based information may be exchanged between the security monitoring platform (SMP) and the security alert source through an application programming interface. The location-based information originates from location-based technology integrated into or included on the security alert source.

The system further retrieves location-based information for a plurality of SMAs using one or more application programming interfaces. Similar to the security alert source, the SMAs include location-based technology to identify the location and/or movement of the SMAs. Using a set of parameter limits for one or more location-based parameters, the system evaluates whether any SMAs fall within the parameter limits. Any SMAs that satisfy the established limits for the location-based parameters are associated with the security alert and presented on the security monitoring platform.

In an embodiment, the parameter limits include a maximum distance between the security alert source and the SMAs and a set of movement comparisons between the movement of the security alert source and the movement of the SMAs. An embodiment may also include parameter limits for a difference in elevation between the security alert source and the SMAs and/or identifying a geofence in which the security alert source is located and determining whether any of the SMAs are located within the geofence in which the security alert source is located.

An embodiment further includes a step of classifying each SMA in the plurality of SMAs into two or more distinct categories and establishing parameter limits for each distinct category of SMAs. Alternatively, or in addition, an embodiment includes the step of classifying possible security alert sources into two or more distinct categories with each distinct category of security alert sources having a set of parameter limits.

A further objective of the system is to systematically loop through the evaluation process until an operator of the security monitoring platform inputs a command to stop the system from further evaluation, thereby providing accurate, real-time associations between the security alert source and the SMAs.

The novel security monitoring system includes an SMP configured to communicate with one or more security systems through one or more application programming interfaces. Each security system includes a plurality of SMAs. The SMAs have location-based technology that can communicate location-based information to the SMP. The SMAs are also configured to relay security alerts to the security monitoring platform.

The system further includes an association protocol adapted to evaluate the location based-information for an SMA that relays a security alert and the location based-information for the SMAs to identify any SMAs within one or more location-based parameter limits.

In an embodiment, the location-based technology includes at least one from the group consisting of GPS, compass, altimeter, gyroscope, radio frequency identification (RFID) systems/tags, and accelerometer.

In an embodiment, the SMAs include at least one from the group consisting alarm sources, video sources, outputs, audio sources, security personnel, and situational awareness systems.

In an embodiment, the security monitoring platform includes a parameter update field to allow an operator of the security monitoring platform to manually alter the location-based parameter limits.

In an embodiment, the security monitoring platform includes an electronic display screen to present an operator of the security monitoring platform with visual information to adequately process the security alert.

In an embodiment, the SMP provides an operator with a list of active security alerts and requires the operator to select a security alert for processing before the system begins retrieving location-based information from the security alert source and executing subsequent actions under the association protocol. In an embodiment, the security alert may be automatically chosen for the operator based on a predetermined priority. Once an alert is selected or presented to the operator, the novel method begins the real-time association protocol.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Figure 1:
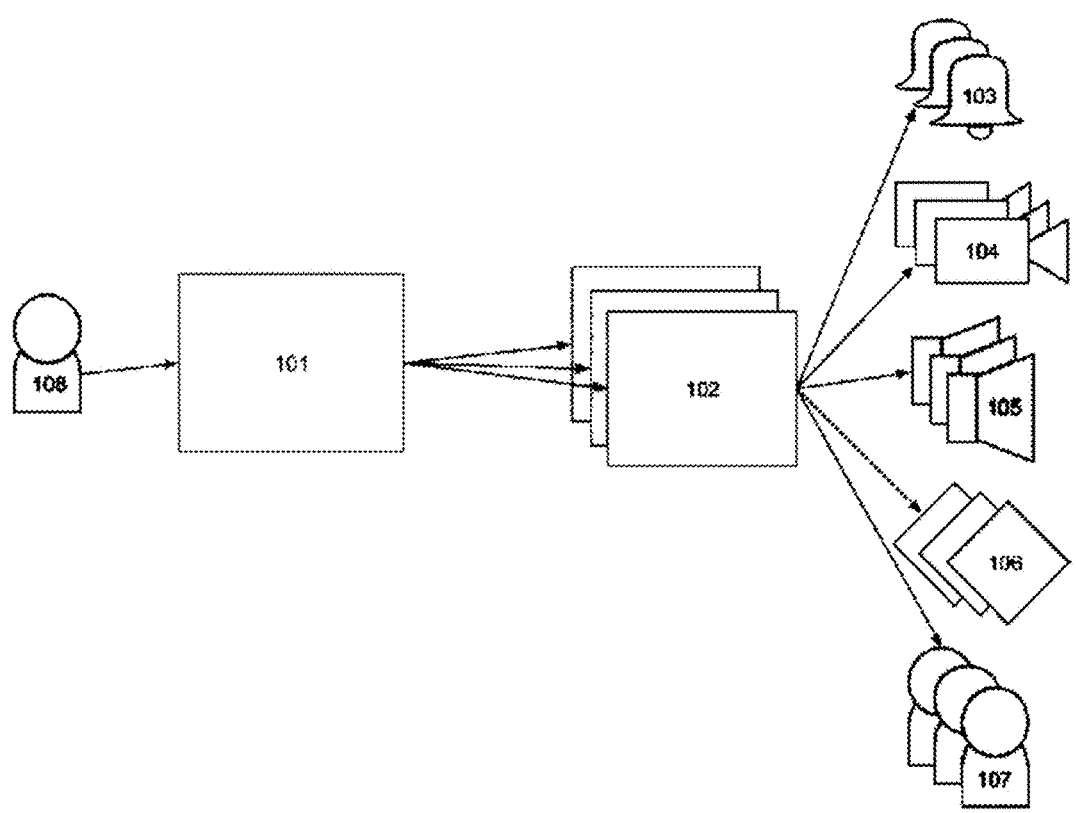
FIG. 1 is a schematic diagram illustrating the typical communication structure of a security-monitoring platform and a plurality of security systems.
Figure 2:
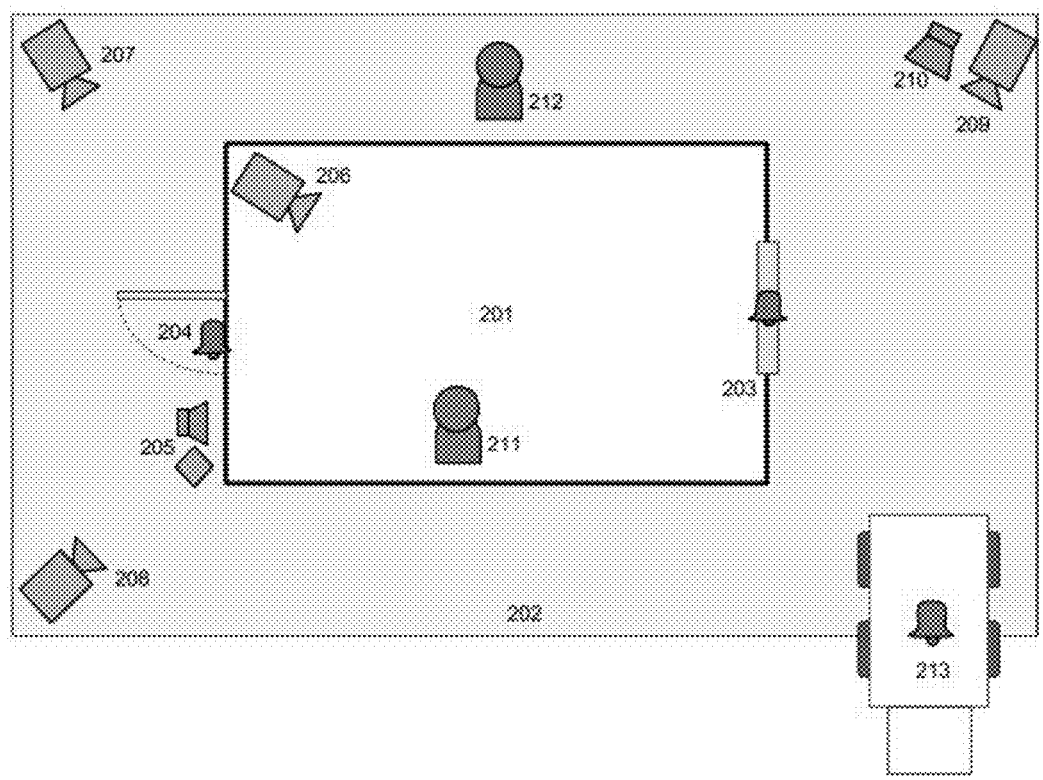
FIG. 2 is an exemplary illustration of a room being monitored by security systems.
Figure 3:
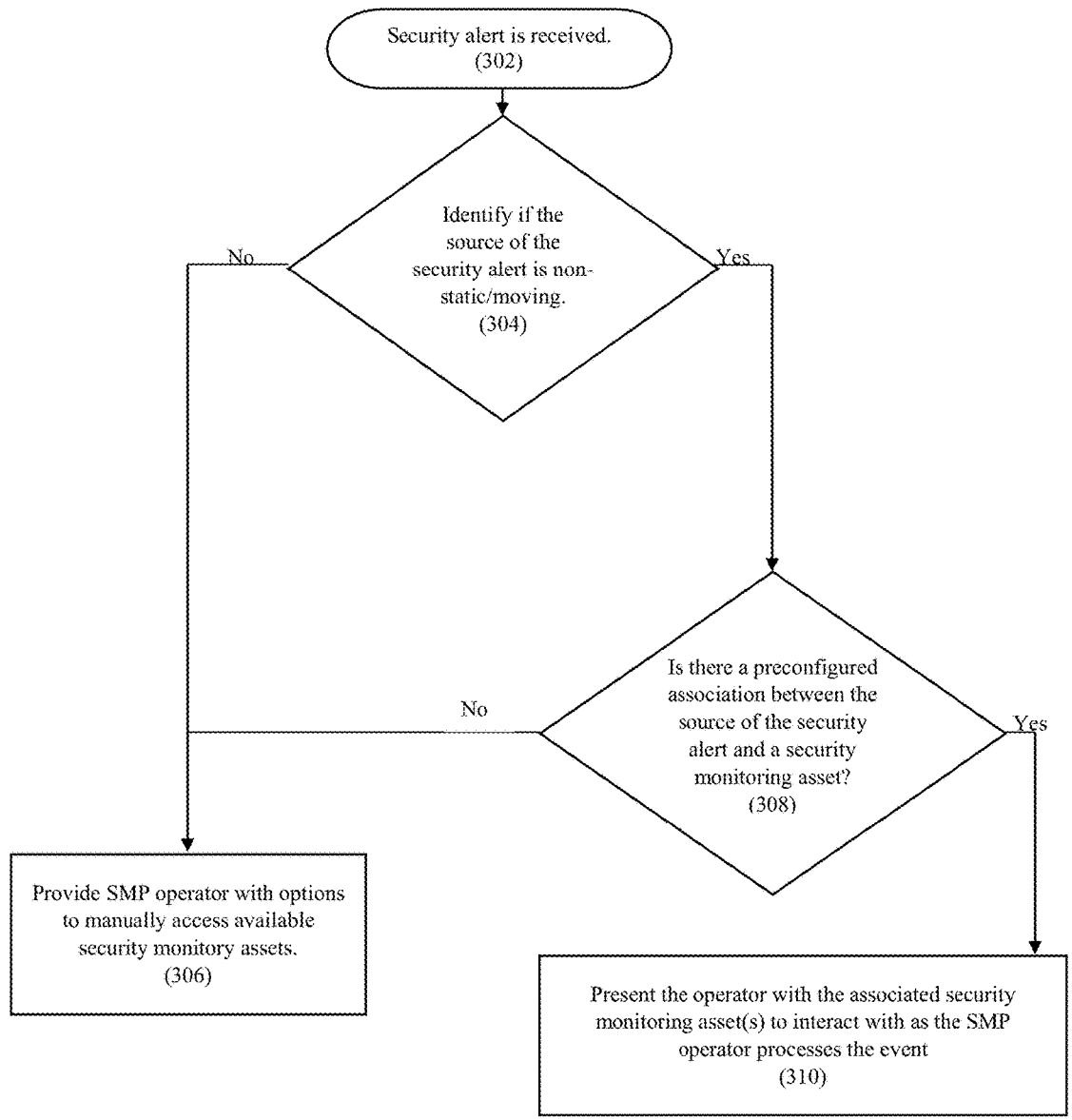
FIG. 3 is a flowchart providing an example of the prior art.
Figure 4:
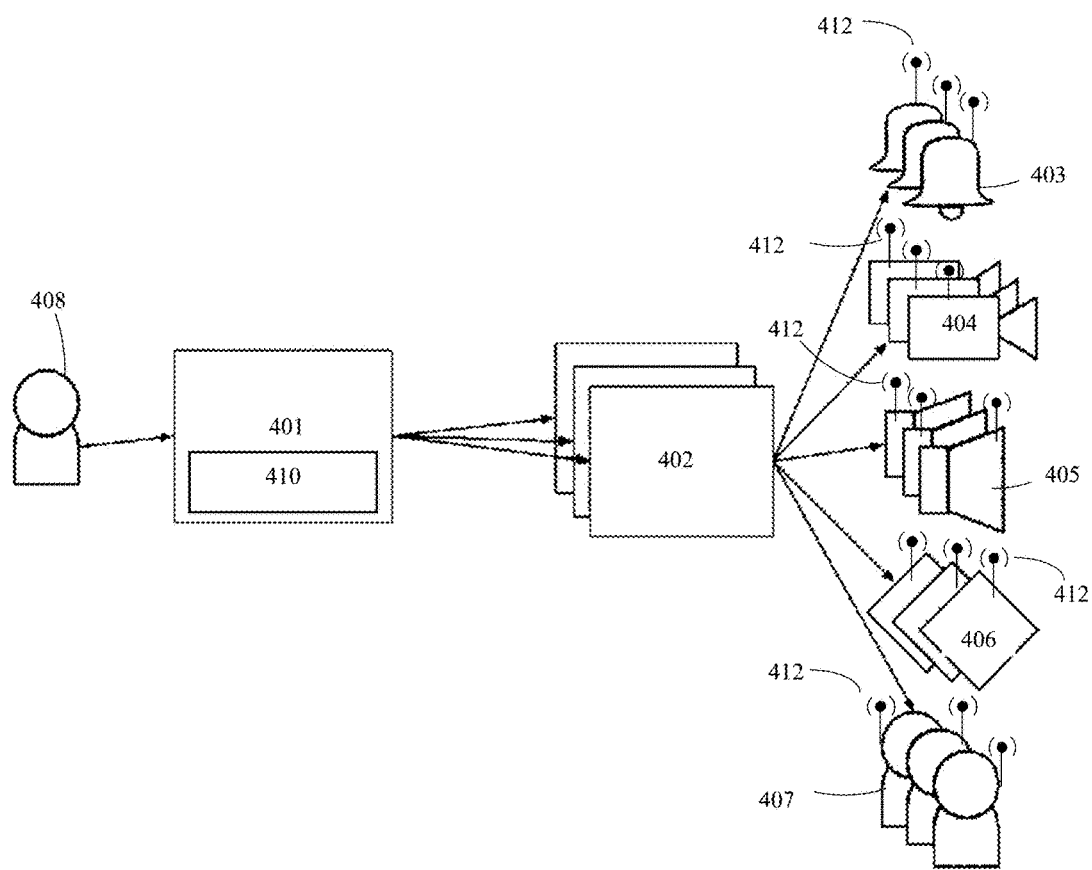
FIG. 4 is a schematic diagram of an embodiment of the present invention.

Referring to FIG. 4, a simplified exemplary illustration, an embodiment of the present invention includes security-monitoring platform (SMP) 401 in communication with security systems 402, and in turn their respective security monitoring assets (SMAs) 403-407. Once connected, SMP operator 408 is capable of interacting with a particular SMA 403-407. Further, the SMAs each include location-based technology 412, which is capable of providing location and/or movement information.

The present invention further includes an association protocol 410 adapted to automatically establish real-time associations between at least one SMA 403-407 and a security alert. A real-time association is the identification of one or more SMAs that provides information relevant to the triggered security alert. SMAs include, but are not limited to, any alarm source 403, video source 404, audio source 405, output 406, security personnel 407 and vehicles (not shown) used to aid in monitoring an object, facility, or person. It should be noted that security personnel may include emergency response personnel, police officers, firefighters, and other individuals serving the public.

A security alert is any alert provided from one of the SMAs, not just threats or alarms. For example, access control systems monitor and control nearly every aspect of a door. Therefore, a non-threatening alert could include, inter alia, a valid card swipe, while a threatening alert could include, inter alia, a forceful entry. Non-threatening alerts are monitored because an operator may want to keep a record of non-threatening activities, such as visual records confirming the identity of persons executing a valid card swipe.

In an embodiment, a security alert may include manually initiated alerts external from the security system. External manual alerts may include, for example, an individual calling/radioing to the security room to inform the security personnel that an intruder was seen or that a member of the public is having a medical emergency. The SMP operator then manually adds the externally identified event to the monitoring platform and establishes a static position of the event based on the provided information.

In an embodiment, each of the SMAs, mobile and static assets, contains location-based technology configured to exchange location-based information with the SMP. As a result, the SMP can pinpoint the location and movement of the source of a security alert and each SMA when a security alert is triggered, and present the SMP operator with the most relevant information to properly address the security alert. Location based-technology may include, but is not limited to, a GPS, compass, altimeter, gyroscope, RFID tags, and accelerometer. The technology may be integrated into the SMAs or be attach as an aftermarket modification. In an embodiment, only the mobile SMAs include location-based technology.

The ability to exchange location-based information with the SMP eliminates the front-end work required to create the proper associations between SMAs. Further, this ability guarantees that any scenario/security alert source will be accurately processed. Additional benefits of the present invention include drastically reducing manual data entry, eliminating possible human error in creating associations, enabling full leverage of dynamically moving SMAs, and allowing for additional or replacement SMAs to be seamlessly and efficiently added without having to conduct a manual association prior to operation.

Figure 5:
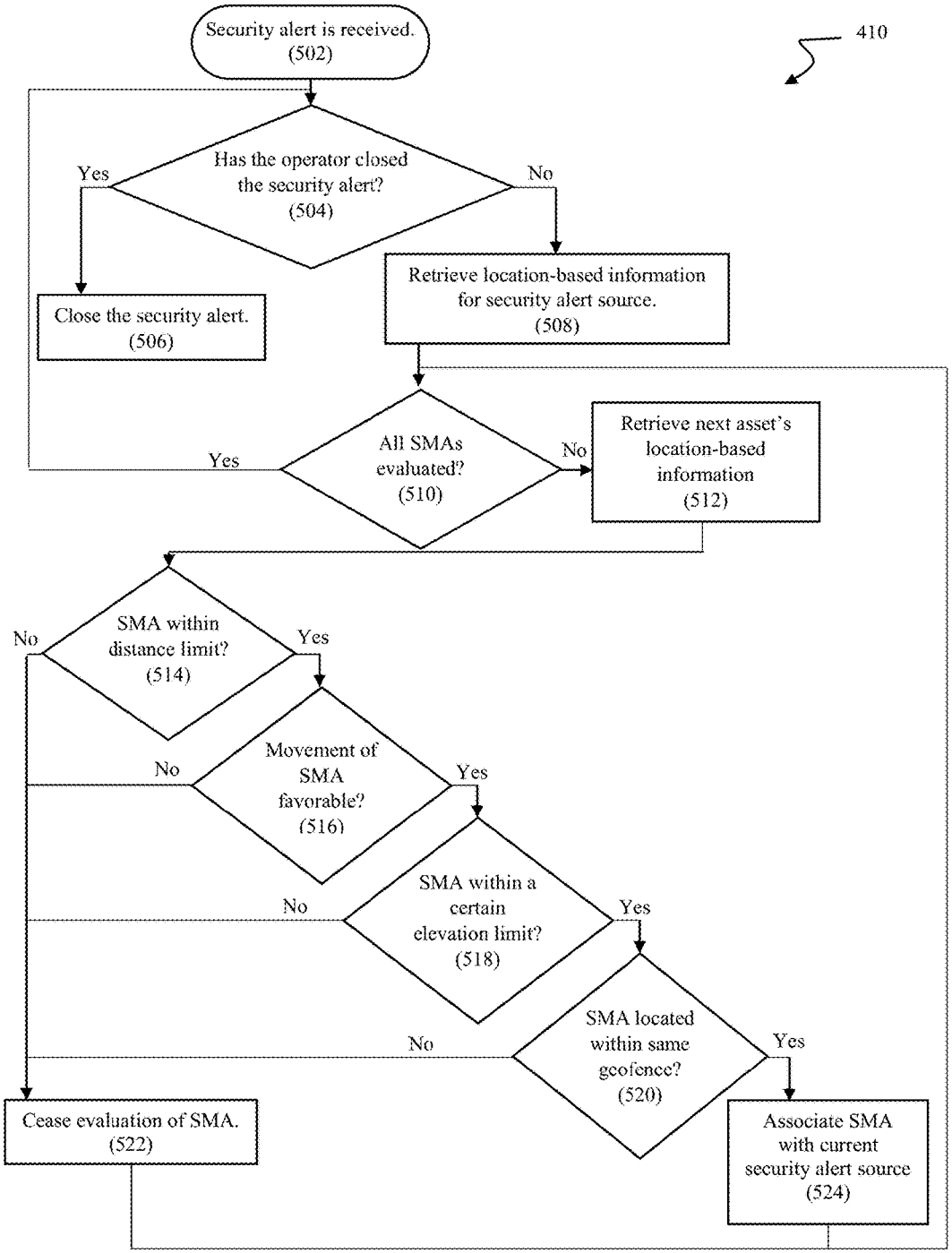
FIG. 5 is a flowchart of an embodiment of the present invention.

Referring to the flowchart provided in FIG. 5, an exemplary embodiment of the association protocol 410, automatically establishes real-time associations according to the following method. At step 502, the SMP receives a security alert, and at step 504, the SMP operator is presented with the option to close or open/process the security alert. The SMP will close the security alert following a close command at step 506. If the operator instructs the system to process or continue processing the security alert, the system retrieves the location-based information for the source of the security alert at step 508. Subsequently, at step 510, the system determines whether any SMAs have yet to be evaluated while processing this particular security alert. If all SMAs have been evaluated, the system reverts back to step 504. If one or more have yet to be evaluated, the system retrieves the location-based information for the next SMA in the list of SMAs at step 512.

Subsequently, in steps 514-520, the location-based parameters for the SMA currently being evaluated are analyzed to determine whether the location-based parameters fall within a set of boundary limits for each parameter. Specifically, step 514 includes determining whether the SMA is located within a certain distance from the security alert source. At step 516, the system evaluates the direction and speed of the SMA with respect to the security alert source. At step 518, the system compares the differences in elevation between the SMA and the security alert source. Finally, at step 520, the location of the SMA within the a geofence is compared to the location of the security alert source within a geofence.

Starting at step 514, a favorable evaluation of a parameter leads to a subsequent parameter evaluation until either an unfavorable evaluation is recorded or each location-based parameter is deemed favorable. If an unfavorable evaluation is recorded, the system ceases subsequent evaluations at step 522 and reverts back to step 510. Assuming that each location-based parameter is favorable, at step 524, the SMA is automatically associated with the current security alert source and the system reverts back to step 510.

The SMA evaluation process (514-520) is then repeated for the next SMA at steps 510 until all SMAs have been evaluated relative to the current state of the security alert source. When there are no further SMAs to evaluate the process reverts back to step 504 and checks whether the event is still open. If the security alert is still active, the process continues onwards. Accordingly, the security alert source and SMAs are constantly evaluated throughout the duration of the security alert to ensure that the correct SMAs are presented to the operator as the security alert is being processed, no matter how the circumstances change. The constant and thorough evaluation process enables the operator to effectively handle dynamic/moving security alert sources and SMAs in a way, which was not possible before.

The real-time association of a particular SMA with a particular security alert source is dependent on both the location-based parameters of the security alert source and the location-based parameters of the SMAs. Preferably, each parameter is evaluated, but an embodiment may rely on only a subset of the above identified parameters for determining whether an SMA should be associated with a particular security alert source. In addition, an embodiment may evaluate additional parameters that provide location-based information. Furthermore, an embodiment may weigh each parameter differently, such that a non-favorable evaluation of one parameter may be outweighed by the favorable evaluation of one or more other parameters.

While the incorporation of location-based information exchange alone provides a significant improvement over the state of the art, an embodiment of the present invention is also configured to consider the type of security alert that has been triggered. For example, the system may consider a different set of parameters when a fire alarm is the security alert source versus when a door breach is the security alert source. A fire alarm may consider distance, elevation, and geofence parameters. In contrast, a door breach may result in the evaluation of distance, elevation, but not geofence parameters because external doors often align with geofence boundaries and SMAs on either side of the geofence could be of use.

In an embodiment, the parameter limits for evaluation may be considered from the view point of the SMAs rather than the security alert source as discussed above. An embodiment may consider a different set of parameters and/or may weigh parameters differently based on the type of SMA queued for evaluation. For example, a security guard may be evaluated based on a different set of parameters and/or parameters may be weighted differently than the parameters considered for a static camera (e.g. a static camera may be evaluated based on elevation to determine whether the camera is located on the proper floor of a building, whereas the mobility of a security guard may not warrant an evaluation of the guard's elevation). Further, the location of a mobile guard within a desired geofence (such as the internal perimeter of a building) may carry more weight than the guard's current distance from a security alert source, because an exterior wall may be disposed between the guard and the source with the only entry to the building being located on the opposite side of the building.

In an embodiment, the parameter limits may be different for each SMA and/or each security alert source. As an example, a fire alarm triggering a security alert may have greater limits for each parameter, due to the speed at which a fire can expand. While a door intercom may have narrower limits for each parameter than those for the fire alarm due to static positioning of the intercom. Likewise, the parameter limits for a mobile SMA may be greater than the parameter limits for a static SMA due to mobility considerations. The parameter limits are preferably preset limits, but an embodiment may include parameter limits that are adjustable by the SMP operator and/or adjustable through an automated set of additional computer instructions. One such implementation of the automated adjustment of the parameter limits may result from a first round failure of each SMA to fall within the parameter limits of a particular security alert source. With reference to FIG. 5, a first round failure is a progression through steps 510-522 where none of the SMAs are associated with the current security alert source. In response to a first round failure, the system automatically records a non-association and expands the limits of the parameters such that at least one SMA is associated with the security alert.

In an embodiment, the parameter limits are predetermined based on the type of security alert, but can be modified either system-wide or on a case-by-case basis. An exemplary embodiment includes parameters limits of:

Distance: The difference in distance between the SMA and security alert source must be equal to or less than 0.1 miles;

Direction:
  i. If only the SMA is moving, the direction of travel of the SMA and the stationary security alert source must be located between the same two cardinal points as referenced from the location of the SMA;
  ii. If only the security alert source is moving, the direction of travel of the security alert source and the stationary SMA must be located within the same two cardinal points as referenced from the location of the security alert source. Cardinal reference points are the four chief directions on a compass—North, South, East, and West;
  iii. If both the security alert source and the SMA are moving, the direction of travel of the security alert source and the stationary SMA must be located within the same two cardinal points, be located within two opposite cardinal points and moving towards one another, or have a point of intersection;

Speed: The difference in speed between the SMA and security alert source must be equal to or less than 30 mph;

Elevation: The difference in elevation between the SMA and security alert source must be equal to or less than 0.005 miles (26.4 feet); and Geofence: The SMA and security alert source must be located within the same geofence. A geofence is a virtual barrier established in a software program, which typically relies on GPS or RFID systems to establish geographical boundaries.

An example of a case-by-case modification of parameter limits might occur when a customer has a building located in a remote, dry, and wooded location, where forest fires occur often and spread quickly. Such circumstances may require an increased parameter limit for the distance between a security alert source, such as a fire alarm source, and available SMAs. For example, the distance limit for association may be increased from the default 0.1 miles to 1 mile. This modification compensates for the not only the environmental conditions, but also the fact that SMAs are more likely to be spread out in rural areas. Thus, a modification of the distance limit helps to ensure that SMAs will be associated with the fire alarm source if/when it is triggered.

Other likely customizations might include removing or expanding the geofence parameter limit. For example, if a geofence is the perimeter of a building, then under the default parameter limits, the external SMAs will not be associated with a security alert source located within the building. This result may be unfavorable when the security alert is triggered by an external door breach. Therefore, it may be desirable to remove the geofence parameter limit so that the system associates nearby cameras on either side of the door/geofence to capture the intruder whether they are inside or outside of the building/geofence.

In some instances, the system may associate an array of SMAs with a security alert. To account for such instances, an embodiment of the SMP organizes the SMAs based on proximity to the security alert source. The closest SMAs are first presented to the operator with the organized list of SMAs available to the operator. Thus, the operator may select an associated, but not currently presented SMA, for viewing/interaction. The organized list of SMAs will automatically update in the background while the security alert is being processed to account for changes in association between the SMAs and the security alert source as the security alert source and/or SMAs change position and/or heading during the processing of the alert.

As previously explained in the background section, each security system includes an API, which helps establishes communication between the SMP and the security systems' respective SMAs. A program for exchanging location-based information is integrated into the SMP and also the security monitoring assets, if necessary, using, for example, an integration plugin. The SMP is then capable of receiving location-based information the same as any other information exchanged through the security system's API. Moreover, the API simplifies the process of adding or removing SMAs to the security systems. The security systems keep track of their respective SMAs and relay that information to the SMP through the API. The setup is usually a simplified process of adding the connection details (IP, Port, Username, and Password) of the SMAs to the security system and then a synchronization process pulls all of the security system's SMAs into the SMP.

The exchange of location-based information may occur periodically at predetermined time frames and/or may occur when a security alert is triggered. In an embodiment, the security alert source automatically sends its location-based information when it transmits a security alert. In an embodiment, a system incorporating a periodic exchange of location-based information may include a data store that keeps location-based information for the SMAs. In an embodiment, the stored location-based information is accessed to more quickly retrieve location-based information upon a triggering of a security alert. Further, a system may store location-based information to calculate the movement details of the SMAs using, for example, kinematic equations or the like.

Hardware and Software Infrastructure Examples

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

Glossary of Claim Terms

Application Programming Interface: is a software intermediary that enables application programs to interact with each other and share data.

Association: is a software-based link.

Data Store: is any hardware or software capable of storing information.

Encapsulate: is an action to alter a particular computer code to operate in conjunction with another system or program.

Location-Based Information: is information providing the of something or someone.

Location-Based Parameter: is one or more measurable location and/or movement factors.

Security Alert: is any event that alters the status quo and is identifiable by a security system.

Security System: is any system providing security measures.

Security-Monitoring Platform: is a system in communication with one or more security systems designed to allow an operator to monitor and sometimes control the security system and its electronic monitoring security devices.

Security Monitoring Asset: is any monitoring object, including, but not limited to, alarm sources, video sources, outputs, audio sources, security personnel, and situational awareness devices to provide information outside of traditional alarm sources, such as earthquake and weather warnings.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A computer-implemented method for automatically associating security monitoring assets with a security alert comprising executing on a processor the steps of:
   receiving a security alert by a security monitoring platform;
   identifying a source of the security alert and exchanging location-based information for the source of the security alert between the security monitoring platform and the security alert source through an application programming interface, the location-based information originating from location-based technology included on the security alert source;
   retrieving location-based information for a plurality of security monitoring assets by the security monitoring platform, wherein the location-based information originates from location-based technology included on each security monitoring asset;
   establishing parameter limits for one or more location-based parameters, including establishing a maximum distance between the security alert source and one of the security monitoring assets and establishing a set of movement comparisons between the security alert source and one of the security monitoring assets;
   evaluating the retrieved location-based information for security monitoring assets with respect to parameter limits for the one or more location-based parameters; and
   identifying and associating security monitoring assets that satisfy the established limits for the one or more location-based parameters and presenting the identified security monitoring assets that satisfy the established limits for the one or more location-based parameters on the security monitoring platform.

2. The computer-implemented method of claim 1, wherein the step of establishing parameter limits further includes establishing a maximum difference in elevation between the security alert source and one of the security monitoring assets and identifying a geofence in which the security alert source is located and determining whether one of the security monitoring assets is located within the geofence in which the security alert source is located.

3. The computer-implemented method of claim 1, further including the step of classifying each security monitoring asset in the plurality of security monitoring assets into two or more distinct categories.

4. The computer-implemented method of claim 3, wherein the step of establishing parameter limits includes establishing parameter limits for each distinct category of security monitoring assets.

5. The computer-implemented method of claim 1, further including the step of classifying possible security alert sources into two or more distinct categories.

6. The computer-implemented method of claim 5, wherein the step of establishing parameter limits includes establishing parameter limits for each distinct category of security alert sources.

7. The computer-implemented method of claim 1, further including systematically looping through the steps in claim 1 until an operator of the security monitoring platform inputs a command to stop the system from further evaluation.

8. The computer-implemented method of claim 1, wherein the location-based technology includes at least one from the group consisting of GPS, compass, altimeter, gyroscope, RFID system, and accelerometer.

9. A security monitoring system, comprising:
   a security monitoring platform configured to communicate with one or more security systems through application programming interfaces;
   each security system having a plurality of security monitoring assets, the security monitoring assets having location-based technology that can communicate location-based information to the security monitoring platform, the security monitoring assets also configured to relay security alerts to the security monitoring platform; and
   an association program adapted to perform the following steps:
   establishing parameter limits for one or more location-based parameters, including establishing a maximum distance between the security alert source and one of the security monitoring assets and establishing a set of movement comparisons between the security alert source and one of the security monitoring assets;
   evaluating the retrieved location-based information for security monitoring assets with respect to parameter limits for the one or more location-based parameters; and
   identifying and associating security monitoring assets that satisfy the established limits for the one or more location-based parameters and presenting the identified security monitoring assets that satisfy the established limits for the one or more location-based parameters on the security monitoring platform.

10. The computer-implemented method of claim 9, wherein the location-based technology includes at least one from the group consisting of GPS, compass, altimeter, gyroscope, RFID system, and accelerometer.

11. The computer-implemented method of claim 9, wherein security monitoring assets include at least one from the group consisting alarm sources, video sources, outputs, audio sources, security personnel, and situational awareness systems.

12. The computer-implemented method of claim 9, wherein the security monitoring platform includes a parameter update field to allow an operator of the security monitoring platform to manually alter the location-based parameter limits.

13. The computer-implemented method of claim 9, wherein the security monitoring platform includes an electronic display screen to present an operator of the security monitoring platform with visual information to adequately process the security alert.

* * * * *